(12) United States Patent
Knudsen et al.

(10) Patent No.: US 10,326,153 B2
(45) Date of Patent: Jun. 18, 2019

(54) SYSTEM AND METHOD FOR RETURNING MATERIAL FROM THE $BR_2$ SIDE OF AN $H_2/BR_2$ FLOW BATTERY BACK AFTER CROSSOVER

(71) Applicants: Robert Bosch GmbH, Stuttgart (DE); The Regents of the University of California, Oakland, CA (US)

(72) Inventors: Edward Knudsen, Menlo Park, CA (US); Paul Albertus, Washington, DC (US); Michael C. Tucker, Piedmont, CA (US); Kyu Taek Cho, Albany, CA (US); Adam Z. Weber, Pleasant Hill, CA (US)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 15/105,874

(22) PCT Filed: Dec. 22, 2014

(86) PCT No.: PCT/US2014/071835
§ 371 (c)(1),
(2) Date: Jun. 17, 2016

(87) PCT Pub. No.: WO2015/100216
PCT Pub. Date: Jul. 2, 2015

(65) Prior Publication Data
US 2016/0322653 A1 Nov. 3, 2016

Related U.S. Application Data

(60) Provisional application No. 61/919,926, filed on Dec. 23, 2013.

(51) Int. Cl.
*H01M 8/04007* (2016.01)
*H01M 8/20* (2006.01)
(Continued)

(52) U.S. Cl.
CPC ... *H01M 8/04097* (2013.01); *H01M 8/04007* (2013.01); *H01M 8/04216* (2013.01);
(Continued)

(58) Field of Classification Search
None
See application file for complete search history.

(56) References Cited

U.S. PATENT DOCUMENTS 2,904,502 A * 9/1959 Shapleigh ............... C10G 9/14
208/130
3,935,024 A 1/1976 Symons
(Continued)

FOREIGN PATENT DOCUMENTS

WO 2013/086100 A1 6/2013

OTHER PUBLICATIONS

International Search Report corresponding to PCT Application No. PCT/US2014/071835, dated Apr. 17, 2015 (4 pages).

*Primary Examiner* — Barbara L Gilliam
*Assistant Examiner* — Zhongqing Wei
(74) *Attorney, Agent, or Firm* — Maginot Moore & Beck LLP (57) ABSTRACT

A flow battery system includes a first tank having a hydrogen reactant, a second tank having a bromine electrolyte, at least one cell including a hydrogen reactant side operably connected to the first tank through an ¾ feed and return system and a bromine electrolyte side operably connected to the second tank, and a crossover return system. The crossover return system includes a vessel operably connected to the ¾ feed and return system and configured to receive an effluent containing a first portion of the hydrogen reactant and a second portion of the bromine electrolyte, the vessel configured to separate the first portion from the second portion. A first return line returns the first portion of the hydrogen
(Continued)

reactant to the first tank and a second return line returns the bromine electrolyte to the second tank.

20 Claims, 7 Drawing Sheets (51) Int. Cl.
    *H01M 8/04089* (2016.01)
    *H01M 8/18* (2006.01)
    *H01M 8/04082* (2016.01)
    *H01M 8/04276* (2016.01)

(52) U.S. Cl.
    CPC ....... *H01M 8/04283* (2013.01); *H01M 8/188* (2013.01); *H01M 8/20* (2013.01); *H01M 8/04197* (2016.02); *Y02E 60/528* (2013.01)

(56) References Cited

U.S. PATENT DOCUMENTS

| | | | |
|---|---|---|---|
| 4,978,430 A * | 12/1990 | Nakagawa | B01D 53/22 159/DIG. 27 |
| 6,841,294 B1 | 1/2005 | Morrissey et al. | |
| 2008/0078204 A1 * | 4/2008 | Ignatiev | F25B 31/002 62/512 |
| 2008/0220318 A1 | 9/2008 | Brereton et al. | |
| 2009/0107155 A1 * | 4/2009 | Vadivelu | C01B 3/001 62/96 |
| 2012/0021310 A1 * | 1/2012 | Saito | F28B 1/02 429/414 |
| 2012/0299384 A1 * | 11/2012 | Peled | H01M 4/9083 307/77 |
| 2013/0309592 A1 | 11/2013 | Datta et al. | |

* cited by examiner

SYSTEM AND METHOD FOR RETURNING MATERIAL FROM THE BR$_2$ SIDE OF AN H$_2$/BR$_2$ FLOW BATTERY BACK AFTER CROSSOVER

CLAIM OF PRIORITY

This application is a 35 U.S.C. § 371 National Stage Application of PCT/US2014/071835, filed on Dec. 22, 2014, which claims the benefit of priority to U.S. provisional application No. 61/919,926, entitled "Methods of Returning Material from the Br$_2$ Side of an H$_2$/Br$_2$ Flow Battery Back to the Br$_2$ Side of the System After Crossover and Systems Thereof," which was filed on Dec. 23, 2013, the disclosures of which are incorporated herein by reference in their entirety.

STATEMENT REGARDING FEDERALLY SPONSORED RESEARCH OR DEVELOPMENT

This invention was made with government support under DE-AR0000137 awarded by the Department of Energy Advanced Research Projects Agency-Energy. The government has certain rights in the invention.

TECHNICAL FIELD

This disclosure relates generally to the field of rechargeable batteries and more particularly to flow batteries and flow battery systems.

BACKGROUND

As intermittent renewable energy sources such as wind and solar increase their share of overall energy production, a method is required to compensate for their intermittency and to match the demand of a power grid in real time. Numerous methods have been discussed to stabilize intermittent renewables, including grid extension to average over larger sets of intermittent assets, demand-side management, ramping of conventional assets, and energy storage, including technologies such as electrochemical storage, such as Li-ion, Na/S, and Na/NiCl$_2$, thermal storage, power to gas, and other energy storage technologies. Flow batteries are one particularly promising technology used to store electrical energy and stabilize power flow from intermittent renewable energy sources. While the most prominent flow battery couple uses vanadium at different oxidation states at each electrode, there are many other couples under consideration, with reactants in the gas, liquid, and solid forms.

One particular flow battery reacts H$_2$ and Br$_2$ to form HBr on discharge. One advantage of this couple is that the H$_2$ reaction is kinetically rapid when catalyzed and the Br$_2$ reaction is kinetically rapid, whether or not the reaction is catalyzed. Rapid kinetics and the ability to obtain components from the related system reacting H$_2$ and O$_2$ in a proton-exchange membrane fuel cell enable the H$_2$/Br$_2$ chemistry to achieve a very high power density. This high power density reduces the area required for a given amount of power and, since the system cost has a significant dependence on the total area over which the reactions are carried out, holds promise for energy storage with reduced costs.

Figure 1:
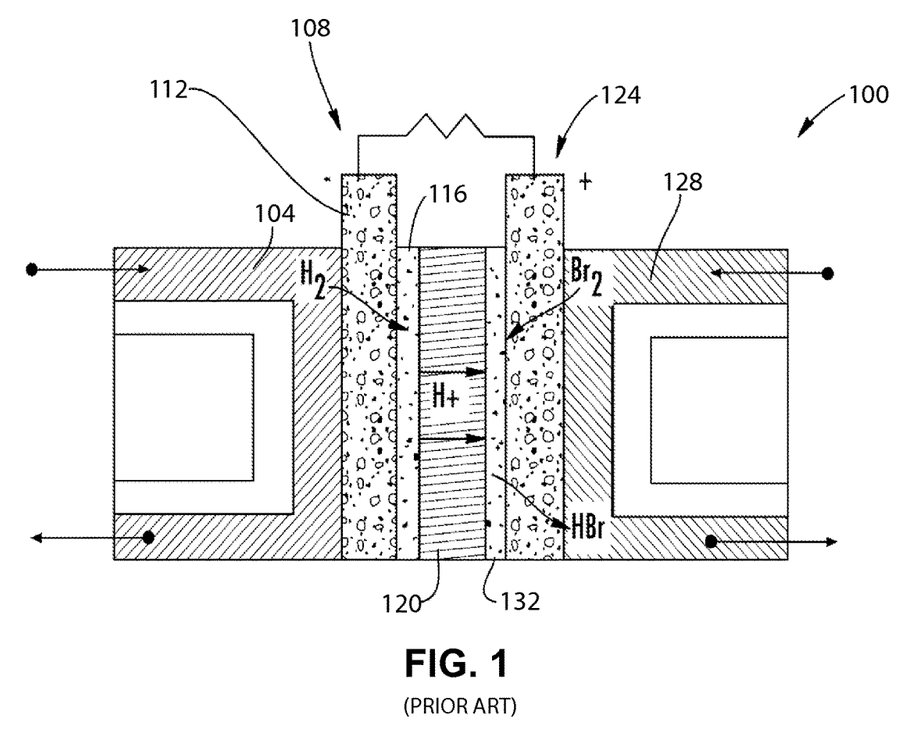
FIG. 1 is a schematic diagram of a conventional flow battery cell.

FIG. 1 illustrates a schematic diagram of a conventional H$_2$/Br$_2$ flow battery cell 100 including a number of cell layers included in the cell 100. FIG. 1 illustrates the reactions occurring during battery discharge, though reversing the illustrated reactions results in charging the battery cell 100. Hydrogen gas (H$_2$) is sent through a hydrogen gas channel 104 into a negative electrode 108, at which a porous medium 112 and a catalyst layer 116 are present. The catalyst layer 116 is typically made of Platinum (Pt) to catalyze H$_2$ oxidation on discharge and hydrogen ion (H$^+$) reduction on charge. During discharge, H$^+$ is produced from the H$_2$ gas via the reaction H$_2 \rightarrow$2H$^+$+2e$^-$. The H$^+$ passes through a membrane 120 to a positive electrode 124, where it is combined with Br– to form hydrobromic acid (HBr) via the reaction Br$_2$+2H$^+$+2e$^- \rightarrow$2HBr. The membrane 120, in one or more embodiments, is an ion-exchange membrane, such as the cation-exchange membrane Nafion, or a separator with pores through which the H+ passes. On the positive electrode side, a liquid solution composed of Br$_2$ and HBr is delivered and flows through a Br$_2$/HBr channel 128 by the positive electrode 124. A porous electrode 124 is always present, though the catalyst 132 layer is optional on the positive electrode side since the kinetics of the Br$_2$ reaction (Br$_2$+2e$^- \rightarrow$2Br$^-$ on discharge and 2Br$^- \rightarrow$Br$_2$+2e$^-$ on charge) are fast even on uncatalyzed carbon. The presence of HBr, which typically dissociates to form H+ and Br–, allows for the conduction of ionic current within the porous electrode. The electrons are passed through an external circuit, where useful work may be extracted (discharge) or added (charge) to the circuit.

In many battery systems, reactants exist in a solid form, and only the shuttle ion is mobile. However, in flow batteries, at least one of the reactant materials exists in a liquid or a gas phase. Many of these liquid or gas reactant materials have a tendency to cross through the cell membrane. When these crossover events occur, they can negatively affect the performance of a flow battery. For example, the mobile reactant that has crossed over can directly chemically react with other reactants, which causes a loss of energy since the reaction does not take place electrochemically, and therefore does not generate any useful work. Additionally, crossover events can reduce the charge and discharge capacity of a battery since the reactant material that has crossed over is no longer capable of participating in electrochemical charge and discharge cycles.

Ion crossover results in various problems for different flow battery couples. For example, in a Zn/Br$_2$ battery couple, Br$_2$ in the liquid form can cross over to the zinc metal side, reacting directly on the zinc side instead of at the positive electrode where useful work is produced. In a vanadium/vanadium flow battery couple, vanadium at different oxidation states can cross through the separator and react chemically, reducing the energy efficiency, for example V$^{5+}$+V$^{3+} \leftrightarrow$ 2 V$^{4+}$. In an iron/chromium battery couple, crossover through the separator causes reactions that reduce the energy efficiency and may result in the need to separate the crossed over ions.

In an H$_2$/Br$_2$ flow battery system, several materials have a tendency to migrate through the cell membrane. For example, H$_2$O, Br$_2$, and HBr (as well as polybromide species such as HBr$_3$) molecules may migrate from the liquid side of the cell to the gaseous side of the cell, while H$_2$ molecules may migrate from the gaseous side of the cell to the liquid side of the cell. The rates of these different crossover processes are a function of material properties, material concentrations, cell conditions, and whether the cell is being charged or discharged.

Consequently, what is needed is a flow battery system that reduces reactant crossover, which generally results in a loss of energy efficiency and battery capacity. In addition, what is needed is a system and method to overcome the problem of reactant mixing in the case of hydrogen/bromine chemistries, with a particular focus on the return of bromine species to the bromine side of the cell.

SUMMARY

In one embodiment, a flow battery system comprises a first tank including a hydrogen reactant, a second tank including a bromine electrolyte, at least one cell including a hydrogen reactant side operably connected to the first tank through an $H_2$ feed and return system and a bromine electrolyte side operably connected to the second tank, and a crossover return system. The crossover return system includes a vessel operably connected to the $H_2$ feed and return system and configured to receive an effluent containing a first portion of the hydrogen reactant and a second portion of the bromine electrolyte, the vessel configured to separate the first portion from the second portion. The crossover return system further includes a first return line operably connecting the vessel to the first tank to return first portion of the hydrogen reactant to the first tank and a second return line operably connecting the vessel to the second tank to return the bromine electrolyte to the second tank. The flow battery system therefore separates the bromine electrolyte from the hydrogen reactant and returns the bromine electrolyte to the bromine tank, thereby reducing efficiency losses and battery capacity reductions caused by bromine crossover.

In another embodiment, the crossover return system further comprises a sump operably positioned between the at least one cell and the second tank and configured to receive the effluent and separate a liquid phase portion of the second portion of the bromine electrolyte from the second portion of the hydrogen reactant. The sump is operably connected to the first tank to return the second portion of the hydrogen reactant to the first tank and to the second tank to return the separated liquid phase portion of the bromine electrolyte to the second tank. The sump advantageously removes liquid phase bromine from the effluent and returns the liquid phase bromine to the bromine tank.

In a further embodiment of the flow battery system, the vessel includes a heat exchanger configured to remove heat from the effluent to condense the second portion of the bromine electrolyte into a liquid form. The bromine electrolyte condenses at a higher temperature than the hydrogen reactant, advantageously enabling separation of the $H_2$ and bromine electrolytes by cooling the effluent.

In yet another embodiment, the crossover return system further comprises a compressor configured to increase a gas pressure of the effluent in the vessel. The temperature at which the bromine electrolyte condenses is greater as the gas pressure is increased, and compressing the effluent therefore advantageously reduces the amount of heat the heat exchanger removes from the vessel to condense the bromine electrolyte.

In one embodiment of the flow battery system, the crossover return system further comprises a pressure throttle operably positioned between the vessel and the first tank and configured to reduce an $H_2$ pressure of the hydrogen reactant flowing from the vessel to the first tank. The $H_2$ returning to the first tank can advantageously be reduced to a pressure suitable for the tank after being compressed into the vessel.

In another embodiment, the flow battery system further comprises a cooling loop operably connected to and configured to cool the heat exchanger. In some embodiments, the cooling loop is further configured to cool the at least one cell.

In other embodiments, the heat exchanger further comprises a thermoelectric cooling device configured to remove the heat from the effluent.

In some embodiments, the vessel includes at least one gas-separation membrane having different fluxes for the hydrogen reactant and the bromine electrolyte. The gas-separation membrane is configured such that the effluent flows through the gas-separation membrane in the vessel and the membrane separates the first portion from the second portion.

In another embodiment, the vessel includes one of an adsorption surface and an absorption medium configured to selectively retain one of the hydrogen reactant and the bromine electrolyte to separate the first portion and the second portion of the effluent.

In yet another embodiment, the vessel is pressurized to a pressure at which the second portion of the bromine electrolyte in the effluent condenses while the first portion of the hydrogen reactant remains in gas phase.

In another embodiment, the vessel includes at least one complexing agent configured to react with the second portion of the bromine electrolyte to separate the first portion and the second portion.

In a further embodiment according to the disclosure, a method of operating a flow battery system, comprises: moving an effluent through an $H_2$ feed and return system from at least one of a first tank having a hydrogen reactant and at least one battery cell operably connected to the first tank into a vessel of a crossover return system, the effluent including a first portion of the hydrogen reactant and a second portion of a bromine electrolyte; separating the first portion from the second portion in the vessel; moving the first portion of the hydrogen reactant through a first return line to the first tank; and moving the second portion of the bromine electrolyte through a second return line to a second tank. Separating the bromine electrolyte from the hydrogen reactant and returned the bromine electrolyte to the bromine tank reduces efficiency losses and battery capacity reductions caused by bromine crossover.

In another embodiment, the method further comprises separating a liquid phase portion of the second portion of the bromine electrolyte from the effluent in a sump operably positioned between the at least one cell and the second tank prior to moving the effluent to the vessel and moving the liquid phase portion to the second tank. Liquid phase bromine is advantageously removed from the effluent returned to the bromine tank.

In yet another embodiment of the method, separating the first portion from the second portion further comprises removing heat from the effluent with a heat exchanger positioned in the vessel to condense the second portion of the bromine electrolyte from the first portion of the hydrogen reactant. The bromine electrolyte condenses at a higher temperature than the hydrogen reactant, advantageously enabling separation of the $H_2$ and bromine electrolytes by cooling the effluent.

In a further embodiment, the method further comprises increasing a gas pressure of the effluent with a compressor prior to moving the effluent into the vessel. Since the temperature at which the bromine electrolyte condenses is greater as the gas pressure is increased, compressing the effluent advantageously reduces the amount of heat the heat exchanger removes from the vessel to condense the bromine electrolyte.

In another embodiment, the method further comprises reducing an $H_2$ pressure of the first portion of the hydrogen reactant moving from the vessel to the first tank with a pressure throttle positioned in the first return line. The $H_2$ returning to the first tank can advantageously be reduced to a pressure suitable for the tank after being compressed into the vessel.

In one embodiment, the method further includes cooling the heat exchanger with using a cooling loop.

In some embodiments, the method further comprises cooling the heat exchanger with a thermoelectric cooling device.

In various embodiments, separating the first portion from the second portion further comprising at least one of: moving the effluent through at least one gas-separation membrane in the vessel having different fluxes for the hydrogen reactant and the bromine electrolyte and configured such that the gas-separation membrane separates the first portion from the second portion; moving the effluent through one of an adsorption surface and an absorption medium in the vessel configured to selectively retain one of the hydrogen reactant and the bromine electrolyte to separate the first portion and the second portion; pressurizing the vessel to a pressure at which the second portion of the bromine electrolyte in the effluent condenses while the first portion of the hydrogen reactant remains in gas phase; and combining the effluent with at least one complexing agent in the vessel configured to react with the second portion of the bromine electrolyte to separate the first portion and the second portion.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 2:
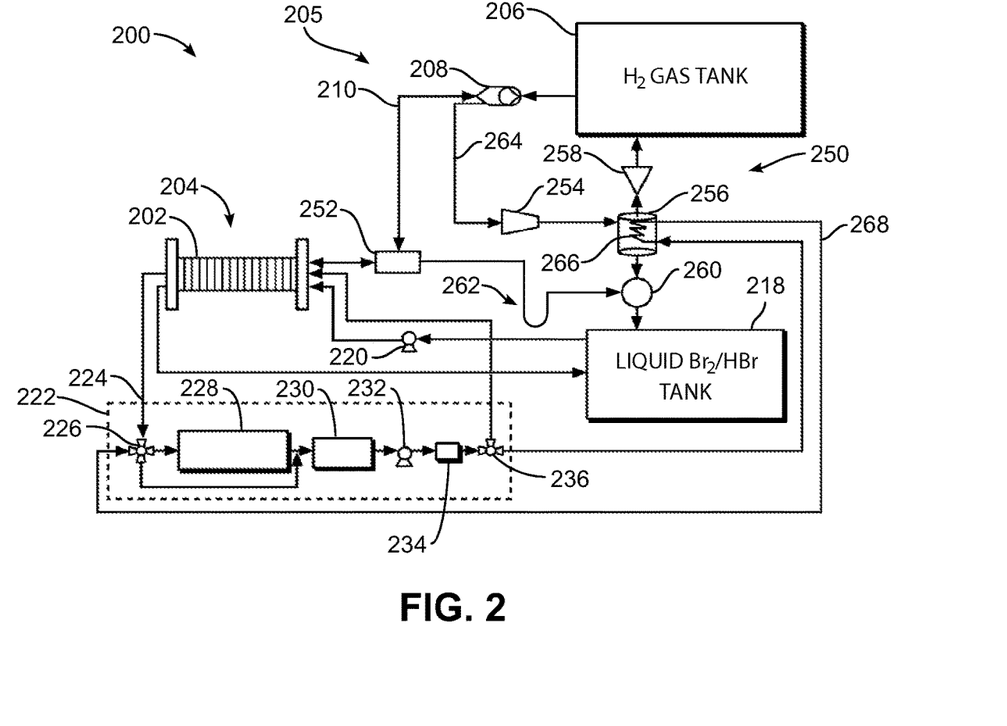
FIG. 2 is a schematic diagram of an $H_2/Br_2$ flow battery system according to the disclosure having a condenser between the compressed $H_2$ gas tank and the liquid $Br_2$/HBr tank.

FIG. 2 schematically illustrates an embodiment of an $H_2/Br_2$ flow battery system 200 according to the present disclosure. The flow battery system 200 includes a plurality of battery cells 202 stacked together to form a battery stack 204. A first supply tank 206 stores a reactant, which, in the illustrated embodiment, is compressed hydrogen gas ($H_2$). The first supply tank is connected to the hydrogen gas side of the battery stack 204 via a $H_2$ feed and return system 205. The $H_2$ feed and return system 205 includes a pressure regulator or pressure switch 208 and a compression line 210. The pressure switch 208 is coupled to the $H_2$ tank 206 and the compression line 210. In one embodiment, the compression line 210 is a mechanical compression line having a compressor (not shown) to compress the hydrogen gas to a predetermined pressure before the gas enters the battery stack 204. In another embodiment, the compression line 210 is an electrochemical $H_2$ compression line that increases the energy density of the system. In the embodiment illustrated in FIG. 2, the $H_2$ is passed through the pressure switch 208 and compression line 210 into the battery stack 204, and then effluent is returned through the compression line 210 and pressure switch 208 when complete. In other embodiments, the $H_2$ feed and return system 205 includes a return line connecting the battery stack 204 to the $H_2$ gas tank 206, forming a loop through which the $H_2$ gas and effluent flows.

A supply tank 218 stores an electrolyte, which, in the illustrated embodiment, is a liquid bromine and hydrogen bromide ($Br_2$/HBr) solution. The $Br_2$/HBr solution is delivered through a pump 220 to a $Br_2$/HBr side of the battery stack 204. In some embodiments, the flow battery system 200 includes a separate coolant loop 222 to cool the $Br_2$/HBr solution flowing through the battery stack 204. The coolant loop 222 receives solution at an input 224 coupled to a thermostat/valve 226, which either directs the solution through a high temperature radiator 228 or bypasses the radiator 228 to a coolant reservoir 230. Cooled solution is stored in the reservoir 230 for delivery to the battery stack 204 by coolant pump 232 through a coolant DI filter 234 and a coolant outlet valve 236. In other embodiments, the $Br_2$/HBr solution is passed through a radiator for cooling instead of the system including a separate coolant loop 222.

As described above, compression of the $H_2$ gas, in different embodiments, is accomplished in a number of ways, including electrochemical compression or mechanical compression. Electrochemical compression has higher energy efficiency than mechanical compression, but results in the battery stack 204 operating at an elevated pressure.

In some embodiments, a battery management system (not shown) is used to ensure the efficient operation of the $H_2/Br_2$ battery system. In particular, during discharge of the battery stack 204, a predetermined flow of $H_2$ and $Br_2$/HBr is pumped through the battery stack 204 by the pump 220. The predetermined flow is related to the current demanded from the device being supplied with power delivered by the battery stack 204.

The pressure of the hydrogen in the tank 206, in different embodiments, ranges from several bar to several hundred bar, depending on the desired energy density of the system and the permissible energy for $H_2$ compression. The composition of the $Br_2$/HBr electrolyte is chosen based on several factors, including determining the amount of HBr that needs to be present to allow rapid ionic transport within the solution, determining a sufficient amount of $Br_2$ such that the size of the $Br_2$/HBr tank is within design limits for the system, and determining the point at which, as the HBr concentration is increased, the conductivity of membranes (typically Nafion) of the flow battery stack 204 falls due to the membrane drying out. In one embodiment, the concentration in the fully charged state is 1M $Br_2$ in 1M HBr, though higher or lower concentrations are used in other embodiments.

In some flow battery systems, the bromine species may cross over the porous membrane into the hydrogen side of the battery. Effluent moving from the battery stack 204 back to the $H_2$ gas tank 206 therefore includes the $H_2$ gas along with some gas phase bromine entrained in the $H_2$ gas, and may also include a quantity of liquid phase bromine and/or water. Crossover of active material can result in decreased charge capacity of the battery, since the battery has less active bromine material in the bromine tank and on the bromine side of the battery cells.

The flow battery system 200 according to the disclosure includes a bromine return system 250 to separate bromine species and water that cross over onto the hydrogen side and return the bromine species and water to the liquid $Br_2$/HBr tank 218. The bromine return system 250 includes a sump 252, a compressor 254, a condenser 256, a pressure throttle 258, and a liquid collector 260. The sump 252 is operably positioned between the compression line 210 and the battery stack 204 and is configured to separate out the liquid phase materials, for example water and bromine species, from the effluent being returned to the hydrogen gas tank 206. The liquid phase materials removed in the sump travel through a U-bend 262, which prevents gaseous material from travelling through the liquid line, and to the liquid collector 260. In some embodiments, the return system includes a check valve or other mechanism in place of or in addition to the U-bend 262 to prevent gas flow through the liquid return line from the sump 252 to the liquid collector 260.

The gaseous effluent flowing through the sump 252 returns through the compression line 210 to the pressure switch 208. During the gas return, the pressure switch 208 routes the gaseous effluent through a gas return line 264, in which the compressor 254 is positioned. The compressor 254 compresses the effluent gas prior to the gas entering the condenser 256. Since the temperature at which the bromine products condense from gas to liquid form is higher at increased pressures, pressurizing the effluent enables the bromine products and water to be condensed in the condenser 256 at higher temperatures.

The condenser 256 includes a heat exchanger 266, which is connected through a cooling line 268 to the coolant loop 226 to cycle coolant through the heat exchanger 266. The heat exchanger 266 removes heat from the pressurized effluent entering the condenser 256, which results in the bromine species and water condensing into liquid form. The hydrogen gas has a lower condensation point than the bromine species and water, and the condenser 256 is configured to operate at a temperature at which the bromine species and water condense to a liquid state and the hydrogen remains in a gaseous state. The hydrogen gas passes through the pressure throttle 258, which reduces the pressure of the hydrogen gas compressed by the compressor 254 prior to the gas entering the hydrogen gas tank 206.

The condensed bromine species and water, now in a liquid state, enter the liquid collector 260, which, in some embodiments, includes another U-bend, check valve, or other barrier to gas transport to prevent gas from passing through the liquid collector 260. The liquid state bromine species and water are subsequently returned to the liquid $Br_2$/HBr tank 218. The compressor and throttle system, in one embodiment, are operated using the power being passed to or from the flow battery. In other embodiments, the compressor and throttle system are operated using the power from other external sources of power. In some embodiments, the system 250 does not include a compressor 254 or a pressure throttle 258, and instead the condenser 256 is cooled to a lower temperature to condense the bromine species, but not low enough that the hydrogen gas condenses.

In some embodiments, the heat exchanger 266 of the condenser 256 is connected to a separate cooling system instead of being connected to the flow battery cooling system 222. The separate cooling system is similar to the flow battery cooling system 222, and includes a coolant reservoir, a radiator, a pump, and a pipe system. The power required to operate the coolant pump is drawn from the power transported to or from the flow battery.

In another embodiment, the heat exchanger 266 in the condenser 256 is a thermoelectric cooling element, or Peltier device. The thermoelectric cooling element receives power from the power transported to or from the battery and uses the power to cool the gas mixture entering the condenser 256. No separate cooling loop or connection to the existing cooling loop is required. In another embodiment, the thermoelectric cooling element is connected to an external power source instead of operating on the battery power.

Figure 3:
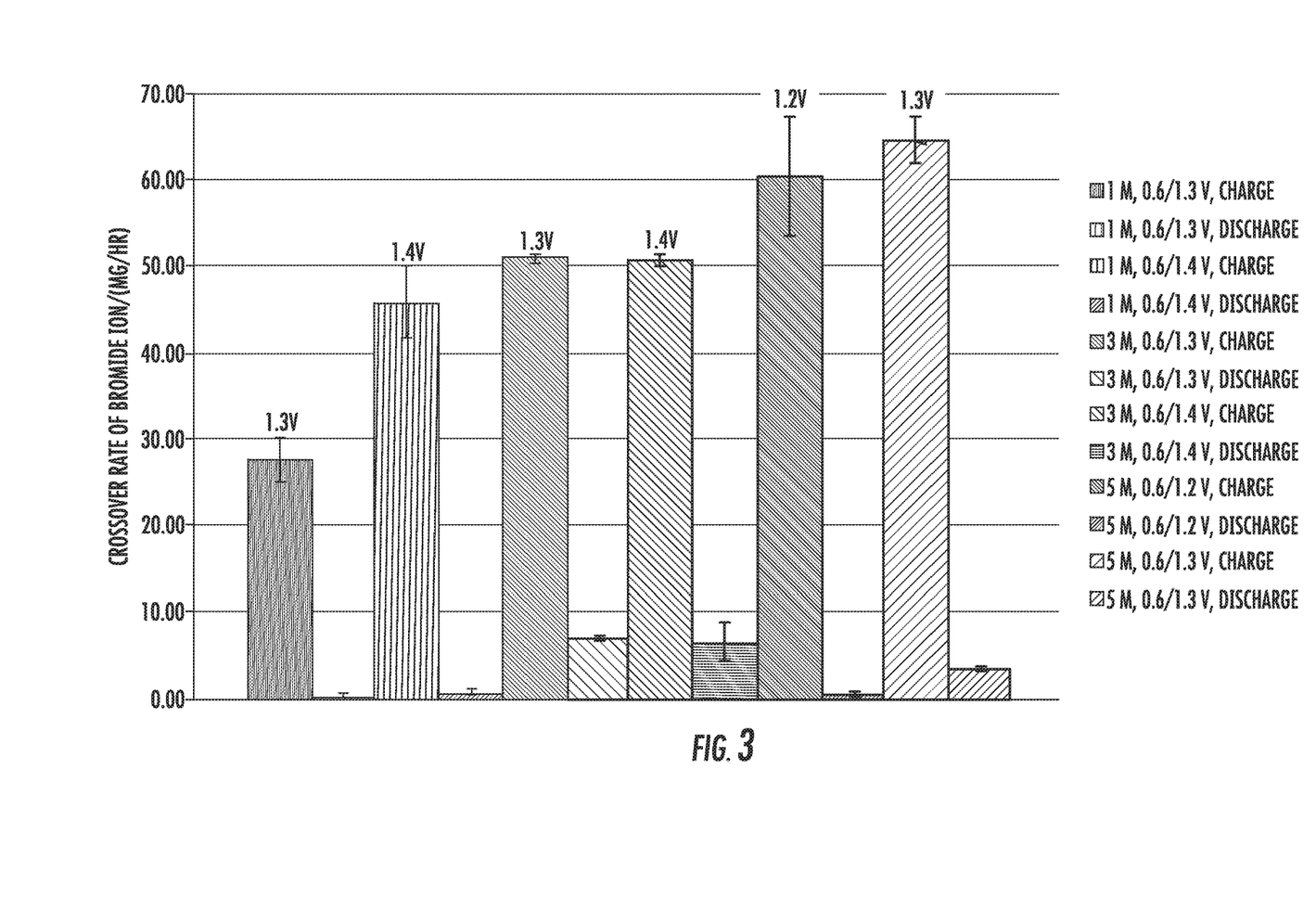
FIG. 3 is graph of experimentally measured rates of bromide ion crossover in a flow battery.

As described above, reactant crossover in a flow battery and flow battery system generally results in a loss of energy efficiency and battery capacity. FIG. 3 illustrates experimentally measured rates of bromide ion crossover through a Nafion cell membrane. In this example, the rate of bromine ion crossover is measured using a 10 $cm^2$ cell for a series of different reactant concentrations and cutoff voltages. Proton flux, or the flow of hydrogen ($H^+$) ions across the ion separation membrane (for example membrane 120), tends to carry water and bromine species with the protons towards the $H_2$ side of the battery cell. The bromine therefore migrates from the liquid side of the cell to the gaseous side, across the cell membrane. The rate of crossover is measured during both charge and discharge events for a variety of initial bromide concentrations. The bromide crossover rate tends to occur more during the charge cycle than during discharge cycles because the proton flux is towards the $H_2$ side of the cell during charge, and, as discussed above, the proton flux carries $H_2O$ and Br species. The rate of crossover is also a function of the initial material concentration in a flow battery cell's liquid tank. Although the present disclosure describes bromine species crossover in the $H_2$/$Br_2$ system, the disclosed methods of active material replenishment are also applicable to other flow battery systems. For instance, in other embodiments, when the battery chemistry is changed, only the particular implementation of the ion capture, return and replenishment strategy requires modification.

Figure 4:
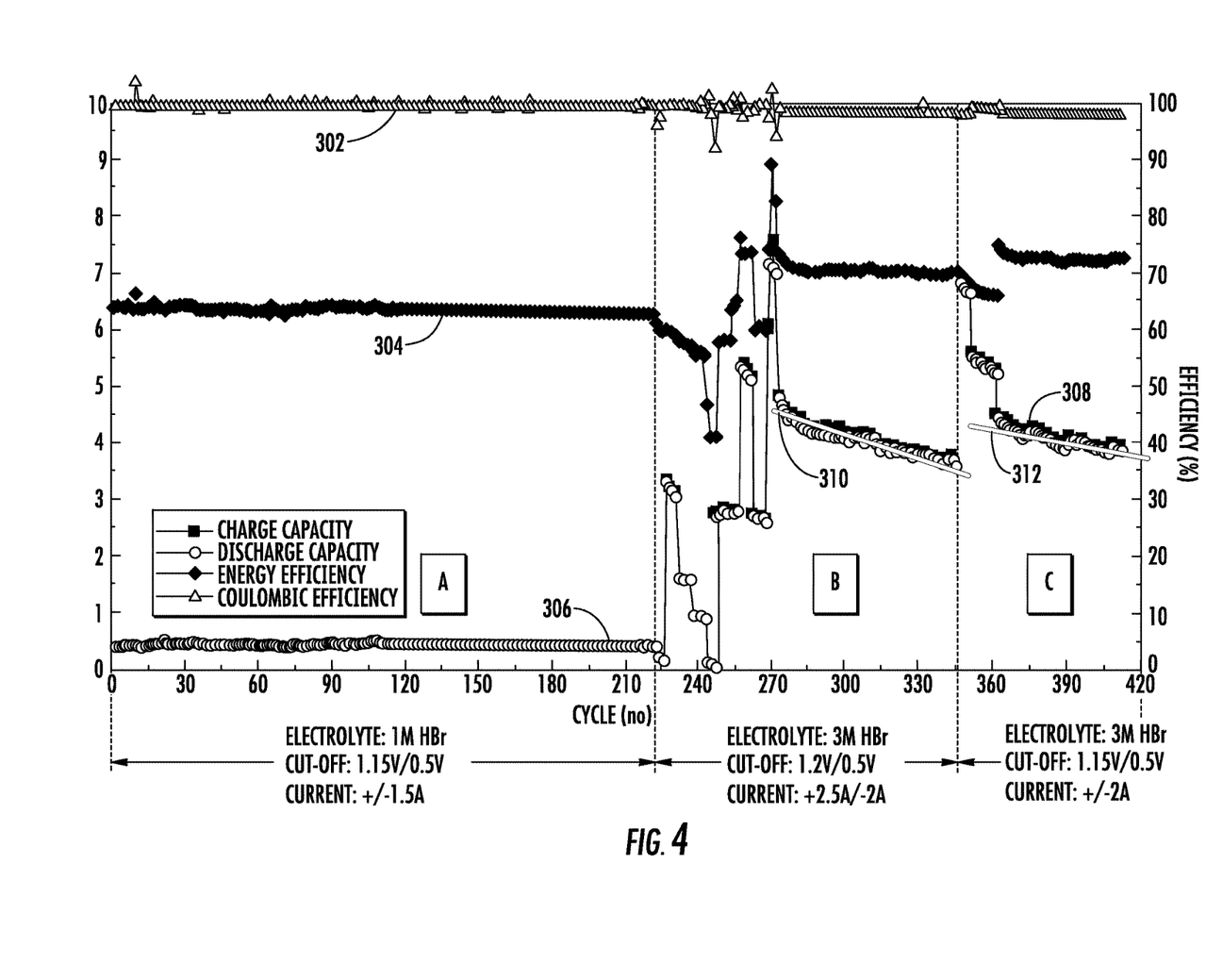
FIG. 4 is a graph of capacities and efficiencies of a flow battery system as a function of battery cycle numbers.

FIG. 4 illustrates a graph of the measured capacity of an operating $H_2$/$Br_2$ flow battery as a function of cycle number. The Coulombic efficiency is shown by line 302, the energy efficiency is shown by line 304, the discharge capacity of the battery cell is indicated by line 306, and the charge capacity is shown as line 308 (charge capacity 308 is generally very similar to the discharge capacity 306, except the portions in areas 'B' and 'C' where the charge capacity is slightly greater than the discharge capacity). In FIG. 4, data is measured using a 10 cm² laboratory cell with imperfect recovery (greater than 99% recovery of the bromine species each cycle, or about 20% lost over 100 cycles) of crossed over active material. The 'A' label indicates operation of the battery with a 1M HBr electrolyte, with cut-offs of 1.15V/0.5V, and a current of +/−1.5 amps for approximately 220 cycles. The 'B' label indicates operation of the battery with an electrolyte of 3M HBr, cut-offs of 1.2V/0.5V, and a current of +2.5 amps and −2.0 amps for approximately 125 cycles, with no replenishment of the active bromine electrolyte material between the 'A' and 'B' operations. After 345 cycles, the Br active material was replenished and the battery was operated with the 3M HBr electrolyte, with a cut-off of 1.15V/0.5V, and a current of +/−2 amps. As illustrated, a fade in capacity occurs during operation under the conditions in 'B' and 'C,' but the capacity of the battery system is recovered after the Br material is replenished.

In frame 'B' of FIG. 4, a number of different electrical currents are applied to the battery to assess the rate capability, resulting in the initial fluctuation of the values. Subsequently, constant current cycling is applied to the battery, and the battery capacity decays at a roughly linear rate with increasing cycling, shown by trend line 310. During this period, active material is crossing over the membrane from the Br side to the $H_2$ side, and most of this material is captured and returned to the bromine tank.

Between frames 'B' and 'C,' the concentration of Br material on the liquid side of the flow battery is replenished to its initial value, resulting in the battery capacity returning to its original performance level at the beginning of frame 'B.' However, the observed fade rate returns as cycling continues, as shown by trend line 312. FIG. 4 demonstrates that the battery returns to its initial capacity after the active material is replenished (between frames 'B' and 'C'), showing that loss of battery charge and discharge capacity by crossover of active material does not cause permanent damage to the battery, and the crossover therefore does not degrade the integrity or charge capability of the cell infrastructure.

Figure 5:
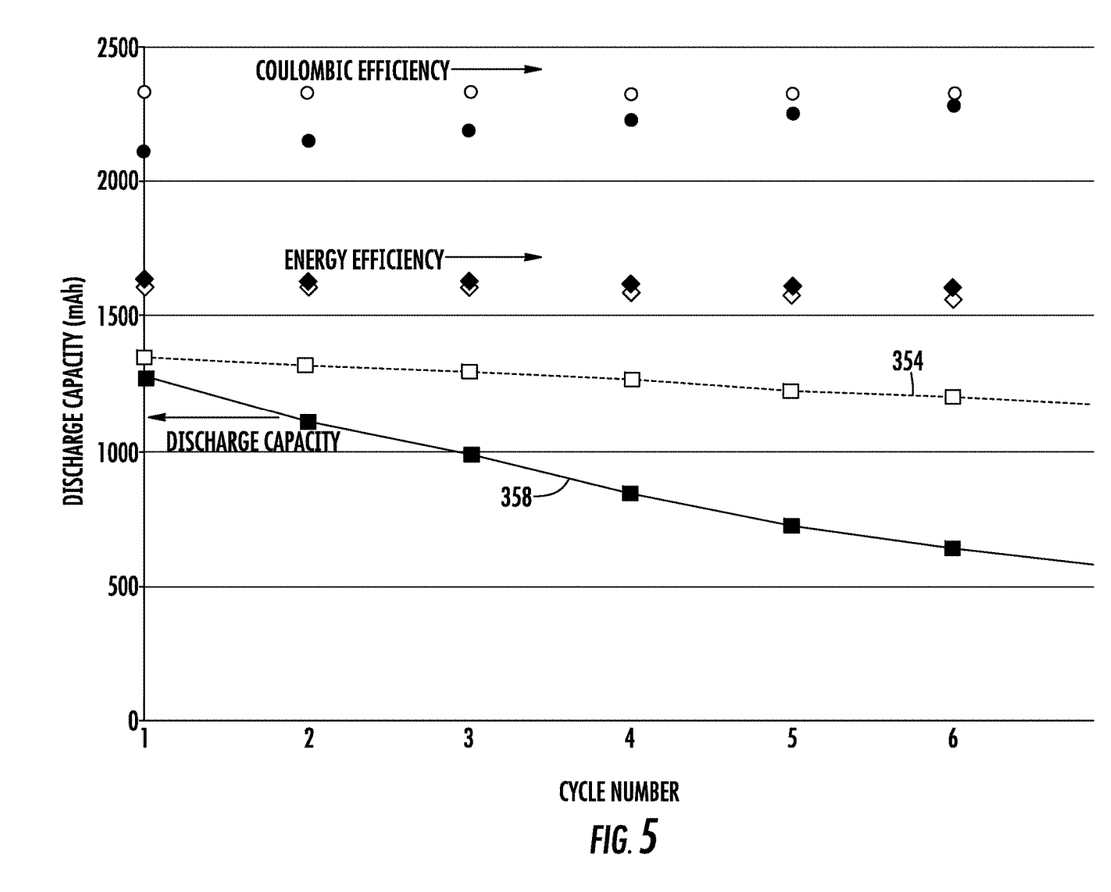
FIG. 5 is a graph of experimental results from the operation of flow battery cells to compare a first setup in which an anode exhaust gas (composed primarily of $H_2$) is vented from the system and not passed through the $Br_2$/HBr side of the cell of a flow battery with a second setup in which an $H_2$ gas passed through the $Br_2$/HBr side of a flow cell battery prior to being exhausted.

FIG. 5 illustrates a plot of discharge capacity versus a number of cycles for two different experimental setups. In the first experiment, the anode exhaust gas (composed of water, $H_2$ and crossed over Br species) is vented from the system and not passed through the $Br_2$/HBr tank, shown by the open data points and line 354 in FIG.5. In the second experiment, the anode exhaust gas is passed through the $Br_2$/HBr tank before being vented, shown by the filled data points and line 358 in FIG. 5.

The $H_2$/$Br_2$ cell was cycled at 300 mA/cm², and all other aspects of the two cell setups were the same. In the experiment in which the exhaust gas is vented, a small amount of bromine species (including bromide ion, polybromides, and possibly molecular bromine) crosses through the cell membrane from the cathode and is released to the atmosphere. This loss of bromine from the system appears as a decay of capacity as shown by line 354 of FIG. 5, the rate of which is much higher than for the case with return of crossover species to the bromine tank shown in FIG. 4. The bromine loss also contributes to the Coulombic inefficiency, as the bromine lost during charge is not available to contribute to discharge capacity during the following half-cycle. With a Coulombic efficiency of approximately 90%, the rate of capacity fade is significant (i.e., less than 100 cycles can be achieved).

In the second case, the anode exhaust is passed through the $Br_2$ tank before being vented. This transfer allows re-capture of the liquid water and some crossed-over bromine that is dissolved in the liquid phase of the anode exhaust. The vapor pressure of bromine in the gas headspace of the tank can be significant, especially at high states-of-charge, when the bromine concentration in the liquid is high and dark bromine gas is visible in the headspace. The bromine vapor is entrained in the anode exhaust gas flow, and vented to the atmosphere. This significant loss of bromine from the system results in rapid degradation of the capacity, as shown by line 358 of FIG. 5. As discussed above, replacing the cathode with fresh material recovers the initial capacity, and consequently the presence of hydrogen in the headspace (and therefore dissolved in the liquid) does not degrade cell components.

Furthermore, the energy efficiency of the two scenarios is very similar. If hydrogen caused a mixed potential on the cathode side (indicating the $H_2$ was reacting), it would appear on the graph of FIG. 5 as reduced energy efficiency. If the presence of hydrogen caused a large self-discharge current, it would appear in the graph as a Coulombic inefficiency. Coulombic efficiency greater than 90% is achieved, indicating that there is no large self-discharge current in the system. During the initial cycles, the Coulombic efficiency is lower due to the rapid loss of bromine from the system. As bromine is removed from the system, the vapor pressure is reduced and the rate of bromine loss is reduced. This accounts for the increase of Coulombic efficiency over the first few cycles.

The crossover of an active material such as Br can significantly degrade the performance of a flow battery system. Simply flowing the anode exhaust through the cathode tank headspace to recapture the dissolved crossed-over bromine species is not effective because some bromine gas is flushed from the tank along with the hydrogen gas, resulting in substantial losses of discharge capacity, as illustrated by line 358 in FIG. 5.

Figure 6:
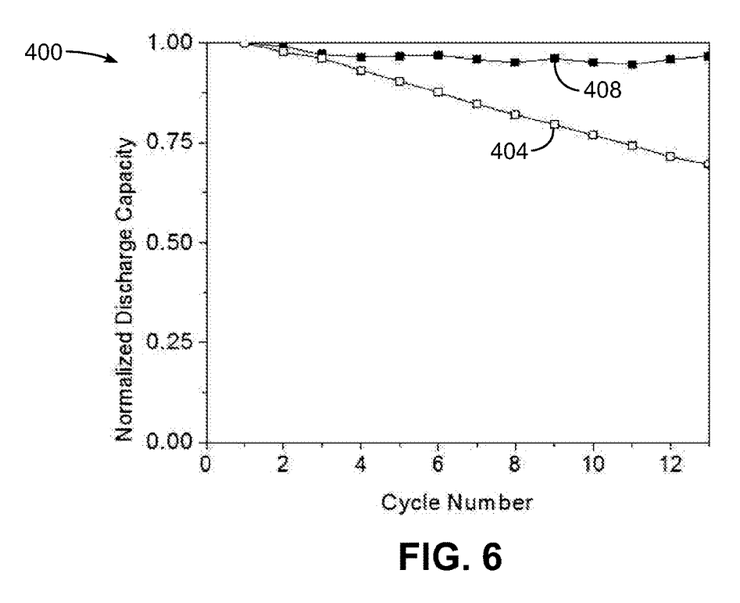
FIG. 6 is a graph of normalized flow battery discharge capacity versus operating cycle number under two different scenarios: first, when anode exhaust liquid is recycled to the cathode of a flow battery, and second, when anode exhaust is not recycled to the cathode of a flow battery.

FIG. 6 illustrates a graph 400 of two sets of $H_2$/$Br_2$ flow battery capacity measurements of a normalized discharge capacity of a system, one set showing recycled anode exhaust liquid from a system such the system 200 described above, and the other set showing no recycling of the anode exhaust liquid. In the first set of measurements (open data points) 404, exhaust gas from the $H_2$ side of the cell is vented directly to the atmosphere, without being passed through a condenser. The open data points therefore show measurements from a cell operating without any return of material to the $Br_2$ tank. In the second set of measurements (filled-in data points) 408, exhaust gas from the $H_2$ side of the cell is passed through a condenser to separate bromine components and water from the gas before the gas is vented to the atmosphere. The liquid that is collected from the condenser is returned to the $Br_2$ storage tank through a check valve.

Line 404 demonstrates a nearly linear decrease in the battery capacity in the experiment in which the battery is vented. After only 10 cycles, due to the loss of bromine material, the capacity of the battery (assuming an infinite supply of $H_2$) has decreased by 25%. Conversely, line 408 illustrates that a cell design and system including a condenser to recover bromine avoids significant capacity fade. The bromine material that is returned to the liquid storage tank continuously restores the capacity losses that have occurred due to crossover. As such, it can be seen that providing a bromine return line with a condenser to separate out hydrogen gas and bromine species substantially reduces charge capacity losses due to crossover of bromine species.

Table 1 is a list of vapor pressure data for both $H_2O$ and HBr over aqueous solutions of HBr at different temperatures and for different concentrations of HBr. Table 1 illustrates that partial pressures of HBr are known to remain relatively low until an aqueous concentration of HBr rises above 50% by weight. The 50% threshold corresponds to a concentration of approximately 9M HBr in an aqueous solution, which is significantly higher than the concentrations on the liquid side of the $H_2/Br_2$ system in the flow battery system. Since the battery is operated at lower concentrations of HBr, the partial pressures of HBr on the gaseous $H_2$ side of the cell remain relatively small. The low vapor pressures of HBr indicate that the HBr is more likely to condense as pressure is increased. Gaseous $H_2$, on the other hand, is not likely to condense unless the gas is compressed to a very high pressure. An increase in the total pressure therefore tends to condense out increasing amounts of bromine containing species from the gas phase hydrogen.

The partial pressures in Table 1 are small enough that only marginal pressure increases may be needed to ensure that capacity losses due to Bromine crossover are kept within design thresholds. Addition of a compressor and pressure throttle, for example the compressor 254 and pressure throttle 258 discussed above in the flow battery system 200, therefore introduce improved separation of Br species from $H_2$ gas, and consequently improve system performance, at a relatively low cost. Additionally, it is noted that $Br_2$ crossing over to the gaseous $H_2$ side is expected to be reduced to HBr or other soluble bromine species and, as a result, a significant partial pressure of $Br_2$ in the gaseous $H_2$ side is not expected.

TABLE 1

| | \multicolumn{8}{c}{mmHg} | | | | | | | |
|---|---|---|---|---|---|---|---|---|
| | 20° C. | | 25° C. | | 50° C. | | 55° C. | |
| % HBr | HBr | $H_2O$ | HBr | $H_2O$ | HBr | $H_2O$ | HBr | $H_2O$ |
| 32 | | | 0.0016 | | | | | |
| 34 | | | 0.0022 | | | | | |
| 36 | | | 0.0033 | | | | | |
| 38 | | | 0.0061 | | | | | |
| 40 | | | 0.011 | | | | | |
| 42 | | | 0.023 | | | | | |
| 44 | | | 0.048 | | | | | |
| 46 | | | 0.10 | | | | | |
| 48 | 0.09 | 6.2 | 0.13 | 8.2 | 1.3 | 30.2 | 2.0 | 38 |
| 50 | 0.23 | 4.5 | 0.37 | 6.1 | 3.2 | 24.3 | 4.6 | 31 |
| 52 | 0.71 | 3.3 | 1.1 | 4.5 | 7.2 | 19.3 | 10.2 | 25 |
| 54 | 2.2 | 2.4 | 3.2 | 3.3 | 17 | 16.0 | 23.0 | 21 |
| 56 | 6.8 | 1.7 | 9.3 | 2.4 | 40 | 13.3 | 51 | 18 |
| 58 | 21 | 1.3 | 27 | 1.9 | 91 | 10.4 | 115 | 14 |
| 60 | | | | | | | 260 | 11.4 |

Figure 7:
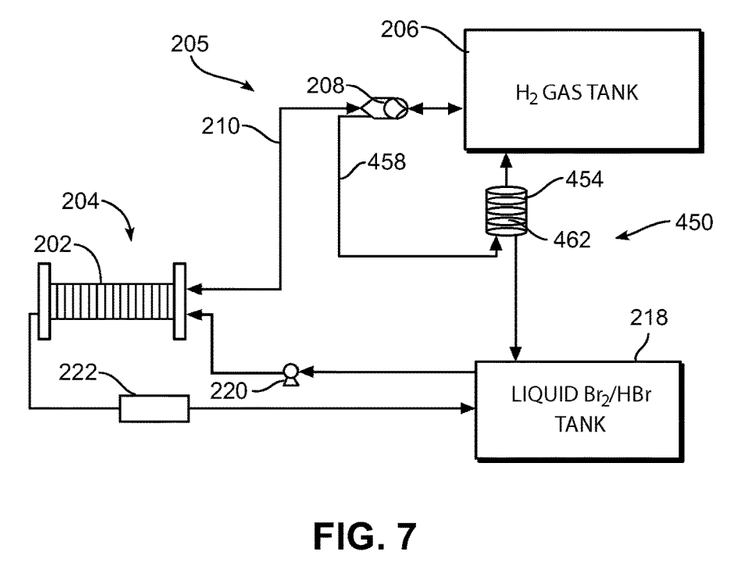
FIG. 7 is a schematic diagram of an $H_2/Br_2$ flow battery system according to the disclosure having a membrane separator between the compressed $H_2$ gas tank and the liquid $Br_2$/HBr tank.

FIG. 7 illustrates another embodiment of a bromine return system 450 for use in a flow battery system such as the flow battery system 200 of FIG. 1. The bromine return system 450 includes a membrane separator 454 connected to the pressure switch 208 via a gas return line 458. In some embodiments, the membrane separator 454 is connected directly to the cathode return of the battery stack 204 instead of being connected to the pressure switch. The membrane separator 454 includes at least one membrane 462 configured to separate the bromine species from the hydrogen gas in the effluent.

In one embodiment, the membrane is a gas-separation membrane that separates species based on differences in flux through a membrane, where the flux is determined by the solubility and diffusivity of the various species in the separation stream. Polymer gas separation membranes (e.g., polydimethylsiloxane) typically demonstrate high permeation rates for species such as $H_2O$ and $H_2$, with heavier species such as polybromides have lower permeation rates. In such an embodiment, $H_2$ (along with some $H_2O$ and possibly other species) would pass through the membrane (i.e., compose the permeate) while heavier bromine species (e.g., polybromides such as $Br_3$— and $Br_5$—, as well as Br— and $Br_2$) would be retained for return to the bromine tank 218. Candidate membranes for this separation should be stable in strong acids and resist fouling, as well as demonstrate a significant difference in permeation rates for $H_2$ (and $H_2O$) compared with Br species. In various embodiments, the membrane 462 includes one or more of hydrocarbon polymers (such as polyethylene), silicon-based polymers (such as polydimethylsiloxane), polysulfones, and fluoropolymers.

Figure 8:
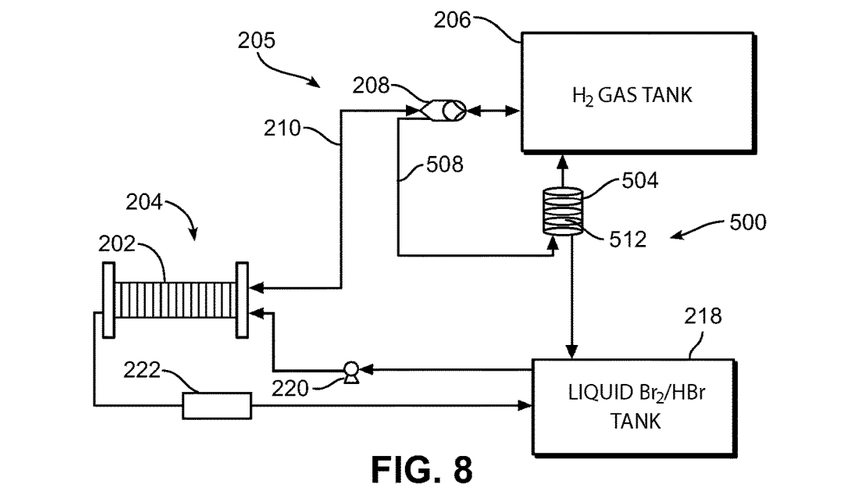
FIG. 8 is a schematic diagram of an $H_2/Br_2$ flow battery system according to the disclosure having an adsorption or absorption separator between the compressed $H_2$ gas tank and the liquid $Br_2$/HBr tank.

FIG. 8 illustrates another embodiment of a bromine return system 500 for use in a flow battery system such as the flow battery system 200 of FIG. 1. The bromine return system 500 includes an adsorption or absorption separator 504 connected via a gas return line 508 to the pressure switch 208. Although the illustrated embodiment shows the gas return line connected to the pressure switch 208, in some embodiments the adsorption or absorption separator 504 is connected directly to the cathode side of the battery stack 204. The adsorption or absorption separator includes at least one an adsorption surface or absorption medium 512 configured to employ selective adhesion or dissolution of a species onto or into a separate medium. The adsorption surface or absorption medium 512 may be configured to selectively retain either the non-Br species (such as $H_2$ and $H_2O$) or the Br species from the effluent.

In one embodiment, the absorption medium 512 is a desiccant, which removes water and leaves behind a stream enriched in bromine species with a separate gas phase. The desiccant is regenerated thermally. In another embodiment the adsorption surface 512 includes zeolites, which selectively adsorbs the bromine species, which are then removed in a regeneration step, for example by thermal regeneration. In another embodiment, the adsorption surface 512 includes activated carbons. In some embodiments, the adsorption or absorption separator includes both activated carbons and zeolites. In another embodiment, metal-organic frameworks are used to carry out adsorption processes that would allow the separation of the Br species in the exhaust of the cathode side of the cell. In another embodiment, the adsorption or absorption separator 504 includes more than one of desiccants, zeolites, activated carbon, and/or metal-organic frameworks.

In another embodiment, complexing agents are used to react with and capture bromine species in the effluent after the bromine species have crossed through to the gas side of the battery cell. The complexing agents are stored in a tank, which can be positioned in the system in place of tank 504 in the embodiment of FIG. 8. The complexing agents include, in one or more embodiments, quaternary ammonium bromides such as N-ethyl-N-methyl-pyrrolidinium bromide (MEP) because such complexing agents reduce the vapor pressure of $Br_2$ while still providing significant reaction rates. In one particular embodiment, the tank includes complexing agents including MEP mixed with a Br-containing solution extracted from the $H_2$ side of the cell. Separation of the complexing agent from the Br species is accomplished with a thermal treatment or another method in order to regenerate fresh complexing agent and an enriched Br solution.

Figure 9:
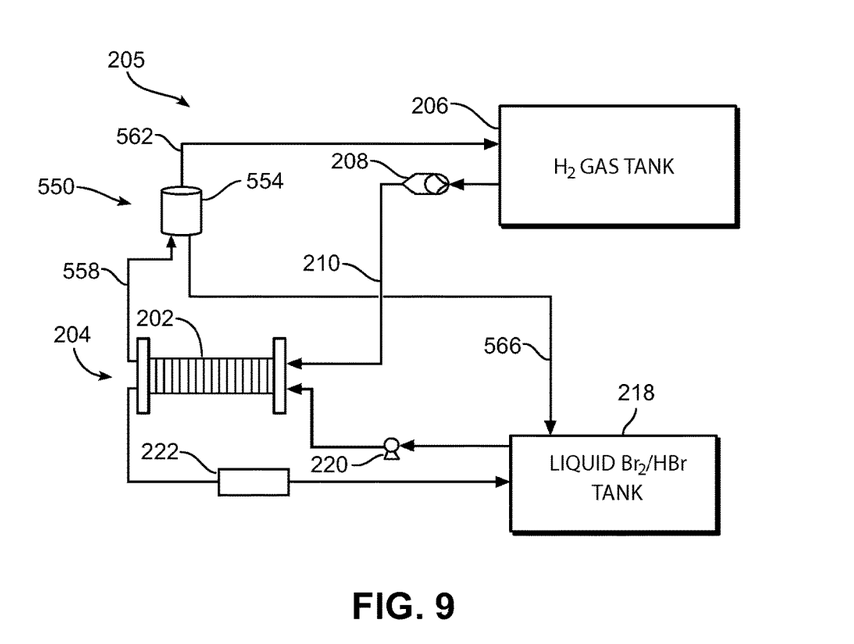
FIG. 9 is a schematic diagram of an $H_2/Br_2$ flow battery system according to the disclosure having a pressure vessel between the battery stack and the compressed $H_2$ gas tank to separate bromine species from the hydrogen gas.

FIG. 9 illustrates another embodiment of a bromine return system 550 for use in a flow battery system such as the flow battery system 200 of FIG. 1. The bromine return system 550 includes a small pressurization tank 554 configured to condense volatiles out of the effluent. The products from the cathode side of the battery cell 204 are passed through a return line 558 to the pressurization tank 554 having an increased pressure. Species other than $H_2$ will condense out as the pressure is increased, with the condensates, for example enriched in $Br_2$ and $H_2O$, collected at the bottom of the tank 554. The $H_2$ is then be evacuated to the full-size $H_2$ storage tank 206 via gas return line 562, while the liquid is transported through liquid return line 566 back to the liquid tank 218. The advantage of this method compared with condensation directly in the full-size $H_2$ tank is that it allows a more continuous return of the Br species to the Br side of the cell and also limits the exposure of the inside of the full-size $H_2$ tank to reactive bromine species such as aqueous HBr. In the embodiment of FIG. 9, the $H_2$ feed and return system 570 includes the pressure switch 208, the compression line 210, the return line 558, the tank 554, and the gas return line 562 forming a loop through which the hydrogen and effluent travels.

While the disclosure describes an $H_2/Br_2$ flow battery, the reader should appreciate that the disclosure is applicable to the wide class of flow battery systems that depend on active materials being transported into electrodes at sufficiently high rates.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A flow battery system, comprising:
a first tank including a hydrogen reactant;
a second tank including a bromine electrolyte;
at least one cell including a hydrogen reactant side operably connected to the first tank through an $H_2$ feed and return system and a bromine electrolyte side operably connected to the second tank; and
a crossover return system including (i) a vessel operably connected to the $H_2$ feed and return system and configured to receive an effluent containing a first portion comprising at least part of the hydrogen reactant and a second portion comprising at least part of the bromine electrolyte, the vessel configured to separate the first portion from the second portion, (ii) a first return line operably connecting the vessel to the first tank to return first portion comprising at least part of the hydrogen reactant to the first tank, and (iii) a second return line operably connecting the vessel to the second tank to return the second portion comprising at least part of the bromine electrolyte to the second tank.

2. The flow battery system of claim 1, the crossover return system further comprising:
a sump operably positioned between the at least one cell and the second tank and configured to receive the effluent upstream of the vessel and separate a liquid phase portion, which comprises at least part of the bromine electrolyte, of the effluent from the first and second portions, the sump operably connected to the second tank to return the separated liquid phase portion to the second tank, and operably connected to the vessel and configured to move the first and second portions to the vessel.

3. The flow battery system of claim 1, wherein the vessel includes a heat exchanger configured to remove heat from the effluent to condense the second portion into a liquid form.

4. The flow battery system of claim 3, the crossover return system further comprising:
a compressor configured to increase a gas pressure of the effluent in the vessel.

5. The flow battery system of claim 4, the crossover return system further comprising:
a pressure throttle operably positioned between the vessel and the first tank and configured to reduce an $H_2$ pressure of the hydrogen reactant flowing from the vessel to the first tank.

6. The flow battery system of claim 3, further comprising:
a cooling loop operably connected to and configured to cool the heat exchanger.

7. The flow battery system of claim 6, wherein the cooling loop is further configured to cool the at least one cell.

8. The flow battery system of claim 3, the heat exchanger further comprising:
a thermoelectric cooling device configured to remove the heat from the effluent.

9. The flow battery system of claim 1, wherein the vessel includes at least one gas-separation membrane having different fluxes for the hydrogen reactant and the bromine electrolyte and configured such that the effluent flows through the gas-separation membrane in the vessel and the gas-separation membrane separates the first portion from the second portion.

10. The flow battery system of claim 1, wherein the vessel includes one of an adsorption surface and an absorption medium configured to selectively retain one of the hydrogen reactant and the bromine electrolyte to separate the first portion and the second portion of the effluent.

11. The flow battery system of claim 1, wherein the vessel is pressurized to a pressure at which the second portion of the bromine electrolyte in the effluent condenses while the first portion of the hydrogen reactant remains in gas phase.

12. The flow battery system of claim 1, wherein the vessel includes at least one complexing agent configured to react with the second portion of the bromine electrolyte to separate the first portion and the second portion.

13. A method of operating a flow battery system, comprising:
moving an effluent through an $H_2$ feed and return system from at least one of a first tank having a hydrogen reactant and at least one battery cell operably connected to the first tank into a vessel of a crossover return system, the effluent including a first portion comprising the hydrogen reactant and a second portion comprising a bromine electrolyte;
separating the first portion from the second portion in the vessel;
moving the first portion through a first return line to the first tank; and
moving the second portion through a second return line to a second tank.

14. The method of claim 13, further comprising:
separating a liquid phase portion of the effluent from the first and second portions in a sump operably positioned between the at least one cell and the second tank, the liquid phase portion comprising the bromine electrolyte;
moving the first and second portions to the vessel; and
moving the separated liquid phase portion to the second tank.

15. The method of claim 13, separating the first portion from the second portion further comprising:
removing heat from the effluent with a heat exchanger positioned in the vessel to condense the second portion from the first portion.

16. The method of claim 15, further comprising:
increasing a gas pressure of the effluent with a compressor prior to moving the effluent into the vessel.

17. The method of claim 16, further comprising:
reducing an $H_2$ pressure of the first portion moving from the vessel to the first tank with a pressure throttle positioned in the first return line.

18. The method of claim 15, further comprising:
cooling the heat exchanger with using a cooling loop.

19. The method of claim 15, further comprising:
cooling the heat exchanger with a thermoelectric cooling device.

20. The method of claim 13, separating the first portion from the second portion further comprising at least one of:
moving the effluent through at least one gas-separation membrane in the vessel having different fluxes for the hydrogen reactant and the bromine electrolyte and configured such that the gas-separation membrane separates the first portion from the second portion;
moving the effluent through one of an adsorption surface and an absorption medium in the vessel configured to selectively retain one of the hydrogen reactant and the bromine electrolyte to separate the first portion and the second portion;
pressurizing the vessel to a pressure at which the second portion of the bromine electrolyte in the effluent condenses while the first portion of the hydrogen reactant remains in gas phase; and
combining the effluent with at least one complexing agent in the vessel configured to react with the second portion of the bromine electrolyte to separate the first portion and the second portion.

* * * * *